(12) United States Patent
Salama et al.

(10) Patent No.: US 9,904,775 B2
(45) Date of Patent: Feb. 27, 2018

(54) SYSTEMS AND METHODS FOR AUTHENTICATING USER IDENTITY BASED ON USER-DEFINED IMAGE DATA

(71) Applicant: The Toronto-Dominion Bank, Mississauga (CA)

(72) Inventors: Hisham I. Salama, Charlotte, NC (US); Paul Mon-Wah Chan, Markham (CA); Dino D'Agostino, Richmond Hill (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 83 days.

(21) Appl. No.: 14/928,500

(22) Filed: Oct. 30, 2015

(65) Prior Publication Data
US 2016/0132670 A1 May 12, 2016

Related U.S. Application Data

(60) Provisional application No. 62/073,881, filed on Oct. 31, 2014.

(51) Int. Cl.
*G06F 7/04* (2006.01)
*G06F 21/32* (2013.01)
(Continued)

(52) U.S. Cl.
CPC .............. *G06F 21/32* (2013.01); *G06F 21/36* (2013.01); *G06K 9/00281* (2013.01); *G06K 9/00288* (2013.01); *G06K 9/00899* (2013.01); *H04N 5/23293* (2013.01); *H04N 21/41407* (2013.01); *H04N 21/4223* (2013.01);
(Continued)

(58) Field of Classification Search
CPC ..... G06F 21/32; G06F 21/36; H04N 5/23293; G06K 9/00281; G06K 9/00288; G06K 2009/00953; G06K 9/00912
See application file for complete search history.

(56) References Cited

U.S. PATENT DOCUMENTS

| 6,944,318 B1* | 9/2005 | Takata | G06K 9/00617 235/380 |
|---|---|---|---|
| 2012/0063689 A1* | 3/2012 | Tran | G06K 9/00281 382/224 |

(Continued)

*Primary Examiner* — Shewaye Gelagay
*Assistant Examiner* — Carlton Johnson
(74) *Attorney, Agent, or Firm* — Duane Morris LLP

(57) ABSTRACT

The disclosed embodiments include computerized methods and systems that facilitate two-factor authentication of a user based on a user-defined image and information identifying portions of the image sequentially selected by the user. In one aspect, a communications device presents a first digital image of a first user on a touchscreen display. The communications device may receive, from the first user, information identifying portions of the first digital image selected in accordance with a candidate authentication sequence established by the first user. The selected first image portions may, for example, be associated with corresponding facial features of the first user. The communications device may determine whether the candidate authentication sequence matches a reference authentication sequence associated with the first digital image, and may authenticate an identity of the first user, when the first selection sequence is determined to match the second selection sequence.

20 Claims, 5 Drawing Sheets

(51) Int. Cl.

| | |
|---|---|
| *H04N 5/232* | (2006.01) |
| *G06K 9/00* | (2006.01) |
| *G06F 21/36* | (2013.01) |
| *H04N 21/414* | (2011.01) |
| *H04N 21/4223* | (2011.01) |
| *H04N 21/44* | (2011.01) |
| *H04N 21/475* | (2011.01) |

(52) U.S. Cl.
CPC ... *H04N 21/44008* (2013.01); *H04N 21/4753* (2013.01); *G06K 9/00912* (2013.01); *G06K 2009/00953* (2013.01)

(56) References Cited

U.S. PATENT DOCUMENTS

| | | | |
|---|---|---|---|
| 2013/0094719 A1* | 4/2013 | Haddad | G06F 3/011 382/115 |
| 2013/0272586 A1* | 10/2013 | Russo | G06K 9/00087 382/124 |
| 2013/0332365 A1 | 12/2013 | Evans et al. | |
| 2015/0244718 A1 | 8/2015 | Smets et al. | |
| 2016/0071111 A1 | 3/2016 | Wang et al. | |

\* cited by examiner

SYSTEMS AND METHODS FOR AUTHENTICATING USER IDENTITY BASED ON USER-DEFINED IMAGE DATA

CROSS-REFERENCE TO RELATED APPLICATIONS

This application claims the benefit of U.S. Provisional Patent Application No. 62/073,881, Oct. 31, 2015, which is expressly incorporated by reference herein to its entirety.

DESCRIPTION

Technical Field

The disclosed embodiments generally relate to computerized systems and methods for multi-factor authentication, and more particularly, and without limitation, computerized systems and methods that facilitate two-factor authentication of a user based on a user-defined image and information identifying portions of the image sequentially selected by the user.

Background

Today, users rely on mobile devices to purchase goods and services at various retailers and to perform financial services transactions involving various financial institutions. To increase the security of device-based transactions, mobile devices increasingly implement multi-factor authentication techniques for personal identity verification. Biometric identifiers (e.g., fingerprints, iris information, facial recognition, etc.) are often raised as potential second or subsequent factors in multi-factor authentication techniques due to their uniqueness and inherent security. The hardware and storage requirements necessary to incorporate biometric identifiers within mobile-based multi-factor authentication techniques discourage many manufacturers and mobile application developers from relying on biometric identifiers, despite their relative security.

SUMMARY

The disclosed embodiments include computer-implemented systems and methods that facilitate two-factor authentication of a user based on a user-defined image and information identifying portions of the image sequentially selected by the user.

In some instances, a communications device consistent with the disclosed embodiments includes a digital camera, a touchscreen display unit, a storage device, and at least one processor coupled to the storage device, the digital camera, and the touchscreen display unit. The storage device may store software instructions for controlling the at least one processor when executed by the at least one processor, and the at least one processor may be operative with the software instructions and configured to present, using the touchscreen display, first digital image data of a first user. In some aspects, the first digital image data may include at least a portion of a first reference face, the first digital image data being received from the digital camera. The at least one processor is further configured to receive information identifying a plurality of portions of the first digital image data selected by the first user. In certain aspects, the first digital image portions may be selected in accordance with a first selection sequence established by the first user, and the first digital image portions may be associated with corresponding facial features of the first reference face. The at least one processor may be configured to determine whether the first selection sequence matches a second selection sequence associated with the first digital image, and to perform processes that authenticate an identity of the first user, when the first selection sequence is determined to match the second selection sequence.

The disclosed embodiments also include a computer-implemented method that generates using at least one processor, an electronic command to present first digital image data of a first user using the touchscreen display. In some aspects, the first digital image data may include at least a portion of a first reference face, and the first digital image data being received from a digital camera associated of the communication device. The method also includes receiving, using the at least one processor, information identifying a plurality of portions of the first digital image data selected by the first user. In some aspects, the first digital image portions may be selected in accordance with a first selection sequence established by the first user, and the first digital image portions may be associated with corresponding facial features of the first reference face. The method includes determining, using the at least one processor, whether the first selection sequence matches a second selection sequence associated with the first digital image, and performing, using the at least one processor, processes that authenticate an identity of the first user, when the first selection sequence is determined to match the second selection sequence.

The disclosed embodiments also include an apparatus having a storage device and at least one processor coupled to the storage device. The storage device may store software instructions for controlling the at least one processor when executed by the at least one processor, and the at least one processor may be operative with the software instructions and configured to identify a plurality of portions of a first digital image selected by the first user. In some aspects, the first image portions may be associated with corresponding facial features of a first reference face. The at least one processor may be configured to establish a first selection sequence corresponding to the selection of the first image portions by the first user. The at least one processor may also be configured to determine whether the first selection sequence matches a second selection sequence associated with the first digital image, and perform processes that authenticate an identity of the first user, when the first selection sequence is determined to match the second selection sequence.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DESCRIPTION OF THE DRAWINGS

Figure 1:
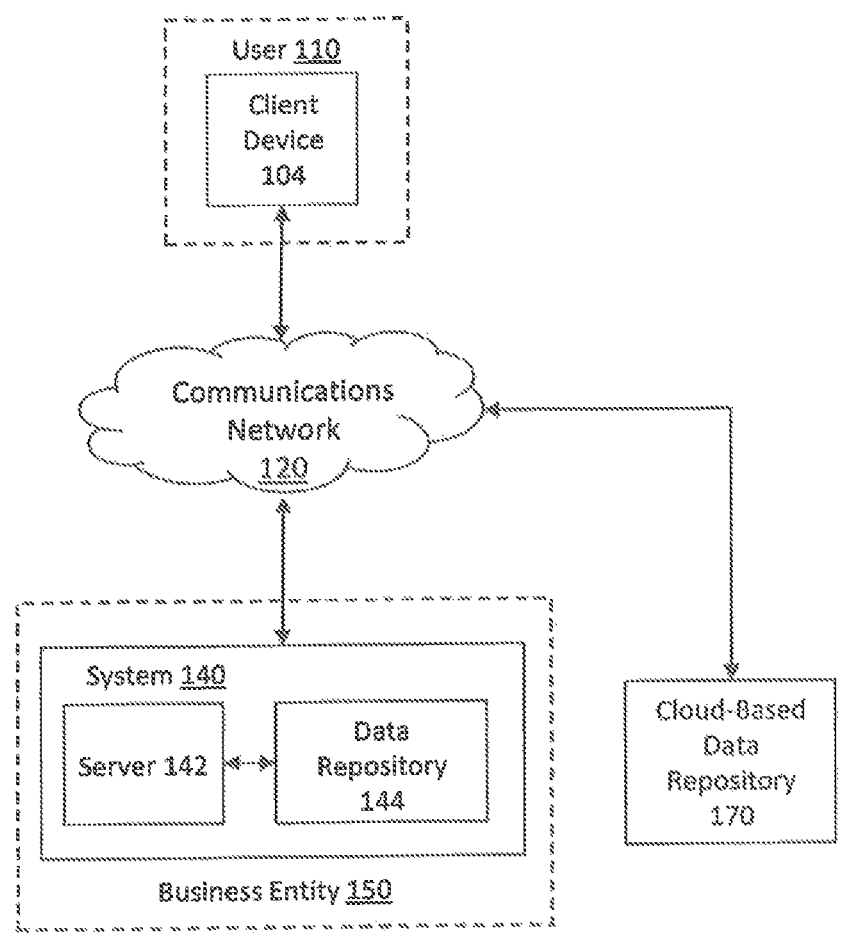
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

FIG. 1 illustrates an exemplary computing environment 100 consistent with certain disclosed embodiments. In one aspect, computing environment 100 may include client device 104, system 140, cloud-based data repository 170, and a communications network 120 connecting one or more of the components of environment 100.

In one embodiment, client device 104 may be a computing device, such as, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, client device 104 may be associated with one or more users, such as user 110. For instance, user 110 may operate client device 104 and may do so to cause client device 104 to perform one or more operations consistent with the disclosed embodiments.

Client device 104 may include known computing device components. For instance, client device 104 may include one or more tangible, non-transitory memories that store data and/or software instructions, and one or more processors configured to execute software instructions. Client device 104 may include one or more display devices that display information to a user and one or more input device(s) to allow the user to input information to client device 104 (e.g., keypad, keyboard, touchscreen, voice activated control technologies, or any other type of known input device). Further, in some aspects, client device 104 may also include one or more digital cameras capable of capturing still digital images, and additionally or alternatively, digital video composed of a plurality of individual frames. The digital cameras may include, for example, a front-facing camera capable of capturing a digital image of user 110 that include a portion of user 110's face and upper torso.

In one aspect, client device 104 may store in memory one or more software applications that run on client device 104 and are executed by the one or more processors. For instance, client device 104 may store software applications that, when executed by one or more processors, perform one or more of the exemplary multi-factor authentication processes outlined below. Further, in some aspects, client device 104 may store software applications that, when executed by one or more processors, perform operations that allow user 110 (through client device 104) to interact with business entity 150 through, for example, a computing device, such as server 142 or other computing component(s) of system 140. In certain aspects, additional software applications may, when executed by client device 104, cause client device 104 to send information to be stored in a memory remote to client device 104 and/or receive information stored in a memory remote to client device 104 (e.g., memory associated with server 142, such as data repository 144). The disclosed embodiments are, however, not limited to such exemplary configurations, and in further embodiments, client device 104 may be configured in any additional or alternate manner to enable communication and data exchange with system 140 across network 120.

Business entity 150 may, for example, be any type of business entity, such as a financial institution that provides financial accounts and financial services transactions one or ore users (e.g., customers of business entity 150). In other embodiments, business entity 130 may include a retailer that enables the one or more users to purchase goods and services for electronic consumption (e.g., on client device 104) or delivery to a physical location. The disclosed embodiments are not limited to such exemplary business entities, and in other aspects, business entity 131 may include any additional or alternate business, governmental, and/or educational entity that requires robust and reliable authentication of user identity.

System 140 may be a computing system configured to execute software instructions to perform one or more operations consistent with disclosed embodiments. In one aspect, system 140 may be associated with business entity 150, e.g., a financial institution, an e-commerce retailer, and/or a physical retailer. System 140 may be a distributed system that may include computing components distributed across one or more networks, such as network 120, or other networks.

In one aspect, system 140 may include computing components known to those skilled in the art and configured to store, maintain, and generate data and software instructions. For example, system 140 may include one or more servers (e.g., server 142) and tangible, non-transitory memory devices (e.g., data repository 144). Server 142 may include one or more computing devices (e.g., servers) that may be configured to execute software instructions to perform one or more processes consistent with the disclosed embodiments. In one example, server 142 may be a computing device that executes software instructions that perform operations that provides information to one or more other components of computing environment 100.

In one embodiment, server 142 may include a computer (e.g., a personal computer, network computer, server, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as a digital e-commerce or banking portal, and services consistent with disclosed embodiments. For instance, server 142 may be configured to provide information associated with a requested web page over communications network 120 to client device 104, which may render the received information and present content from the web page on a display device, e.g., a touchscreen display unit. Additionally, server 142 may be incorporated as a corresponding node in a distributed network, and additionally or alternatively, as a corresponding networked server in a cloud-computing environment. Furthermore, server 142 may communicate via network 120 with one or more additional servers (not shown), which may facilitate the distribution of processes for parallel execution by the additional servers.

Data repository 144 may include one or more memories that are configured to store and provide access to data and/or software instructions. Such memories may include tangible non-transitory computer-readable media that store software instructions that, when executed by one or more processors (e.g., of server 132), perform one or more operations consistent with disclosed embodiments. Data repository 144 may also be configured to store information relating to business entity 150.

Cloud-based data repository 170 may include one or more physical data storage units (e.g., tangible non-transitory computer-readable media) disposed across multiple computing systems and servers. In some aspects, system 140, and additionally or alternatively, client device 104, may be configured to access cloud-based data repository 170 through a corresponding API across network 120 using any of the communications protocols outlined above.

In certain embodiments, client device 104, system 140 (e.g., via database 144), and/or cloud-based data repository 170 may be configured to store information supporting enhanced authentication techniques, such as the exemplary multi-factor authentication techniques described below. For example, the stored information may include biometric information, such as biometric information derived from reference digital images of faces of user 110 and other users. The stored information may also include sequential data, such as a personal identification numbers (PINs) and reference authentication sequences identifying facial and/or physical features within the reference digital images sequentially selected by user 110 and the other users. The stored information may further include other biometric information including, such as fingerprint data, voice recognition data, facial feature extraction data, and/or the like.

Although computing environment 100 is illustrated in FIG. 1 with client device 104 in communication with system 140, and could-based data repository 170, persons of ordinary skill in the art will recognize that environment 100 may include any number of number of mobile or stationary client devices 104, and any additional number of computers, systems, or servers without departing from the spirit or scope of the disclosed embodiments. Further, although computing environment 100 is illustrated in FIG. 1 with a single business entity 150 and/or system 140, and a single could-based data repository 170, persons of ordinary skill in the art will recognize that environment 100 may include any number of additional number of business entities and corresponding systems, any additional number of additional data repositories, any number of additional servers and data repositories, and any additional number of computers, systems, servers, or server farms without departing from the spirit or scope of the disclosed embodiments.

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

The disclosed embodiments may provide computer-implemented systems and methods that facilitate multi-factor authentication of a user (e.g., user 110) based on a user-defined image and information identifying portions of the image sequentially selected by user 110. In some aspects, a user may access a camera functionality of client device 104 (e.g., a front-facing camera) and may capture a digital image of a portion of user 110's face and upper torso (e.g., a self-image or "selfie"). In other aspects, client device 104 may be configured to access digital video composed of a plurality of individual frames (e.g., captured by the front-facing camera of client device 104), and to select the digital image from the individual frames.

Client device 104 may, in some aspects, execute instructions that present the image to user 110, and further, that enable the user to sequentially select a plurality of regions of the image (e.g., user 110's face, nose, cheeks, ears, etc.). For instance, client device 104 may present the image on a touchscreen display, and user 110 may touch or select (e.g., using a finger and/or a stylus) a predetermined number of facial features in a user-defined sequence.

In some embodiments, client device 104 may capture information identifying the sequentially selected features of user 110's face (e.g., based on a mapping between the contacted portions of the touchscreen display and pixels of user 110's image presented by the touchscreen display). By way of example, client device 104 may associate user 110's image with the information identifying the sequentially selected facial features (e.g., positions of the sequentially selected facial features within the presented image, and store the associated image and information within a locally accessible data repository (e.g., memory 115), as described below in reference to FIG. 2.

Figure 2:
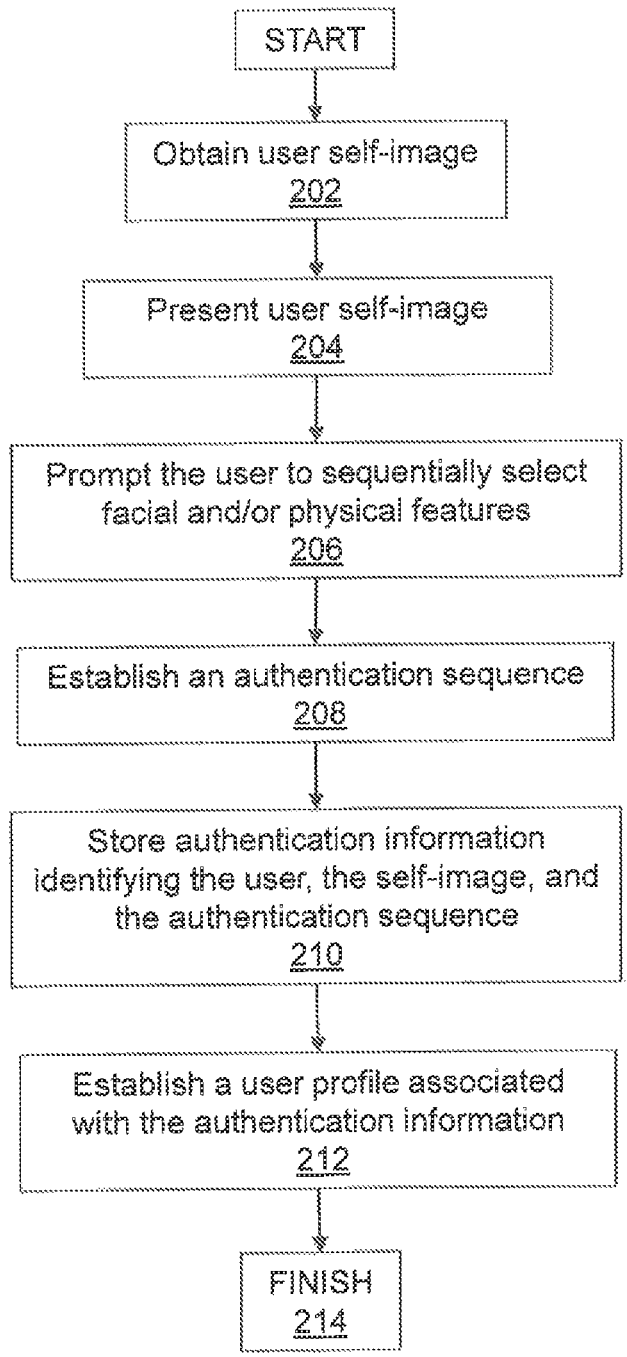
FIG. 2 is a flowchart of an exemplary process for establishing reference authentication information, consistent with disclosed embodiments.

FIG. 2 is a flowchart of an exemplary process 200 for establishing image-based two-factor authentication credentials for a user, in accordance with disclosed embodiments. In one embodiment, a device (e.g., client device 104) may be configured to obtain image data corresponding to a digital image of a user (e.g., user 110), which client device 104 may present to user 110 through a corresponding display device (e.g., a touchscreen display). The disclosed embodiments may enable user 110 to provide information to client device 104 that identifies sequentially selected regions within the presented digital image data, and client device 104 may be configured to execute software instructions that link the provided information to the digital image data and to user 110, and further, to store the captured information, the digital image data, and information identifying user 110 in a local data store (e.g., memory 115), and additionally or alternatively, in a data repository accessible to client device 104 across network 120 (e.g., database 144 and/or cloud-based data repository 170). In certain aspects, the disclosed embodiments may enable client device 104 to access the captured information and the digital image data to authenticate an identity of user 110 through the exemplary two-factor authentication processes outlined below.

In FIG. 2, client device 104 may be configured to execute software instructions that obtain image data corresponding to a digital image of user 110 (e.g., in step 202). In certain aspects, client device 104 may include a digital camera (e.g., a front-facing camera) capable to capturing digital images and/or digital video. By way of example, a digital image captured by the front-facing camera of client device 104 may include a digital self-image of user 110's face and/or upper torso (e.g., a "selfie" taken by holding client device 104 at a distance from user 110's upper torso and face).

In some aspects, the digital camera may capture digital image data (e.g., the digital self-image of user 110's face and/or upper torso) in response to input provided to client device 104 by user 110 (e.g., through a graphical user image (GUI) established by an executed camera application). In other aspects, however, client device 104 may execute stored instructions that detect an occurrence of one or more triggering events, and in response to the detected occurrence, generate one or more electronic commands that cause the digital camera to capture the digital image data. For example, client device 104 may receive, from a remote device across network 120, a signal instructing the digital camera to capture the digital image data, which client device 104 may detect as a triggering event causing the capture of the digital image data. Additionally or alternatively, the detected triggering event may correspond to an expiration of a camera time established by user 110 (e.g., through the GUI of the camera application). In other aspects, the detect triggering event may correspond to one or more actions by user 110, which include, but are not limited to, a disposition of user 110's face and/or upper torso within a field-of-view of the digital camera and a disposition of device 104 within user 110's hand. The disclosed embodiments are not limited to these exemplary triggering events, and in further embodiments, client device 104 may instruct the digital camera to capture the digital image data in response to any additional or alternate triggering event appropriate to client device 104 and the digital camera.

In other aspects, client device 104 may be configured to access digital video composed of a plurality of individual frames (e.g., captured by the front-facing camera of client device 104), and to select the digital image from the individual frames. For example, client device 104 may be configured to identify a corresponding one of the individual frames that includes at least a predetermined number of facial and/or physical features of user 110's face and/or torso, and establish the corresponding one of the identified frames as the selected digital image. In other aspects, client device 104 may be configured to identify a corresponding one of the individual frames that includes at least a predetermined portion of user 110's face (e.g., 50% of user 110's face, a portion of the face extending above user 110's chin, etc.), and establish the corresponding one of the identified frames as the selected digital image.

In other aspects, user 110 may provide, as input to client device 104, information identifying the digital image within a corresponding image repository locally accessible to client device 110 (e.g., previously captured digital images stored in memory 115). Additionally, for example, user 110 may provide input to client device 104 identifying a digital image within a social media application (e.g., Facebook™, Twitter™, Tumblr™, etc.), a cloud-based data repository, or other image store accessible to client device 104 across network 120, and client device 104 may obtain the identified digital image in response to a request submitted through a corresponding API or other programmatic interface.

Figure 3:
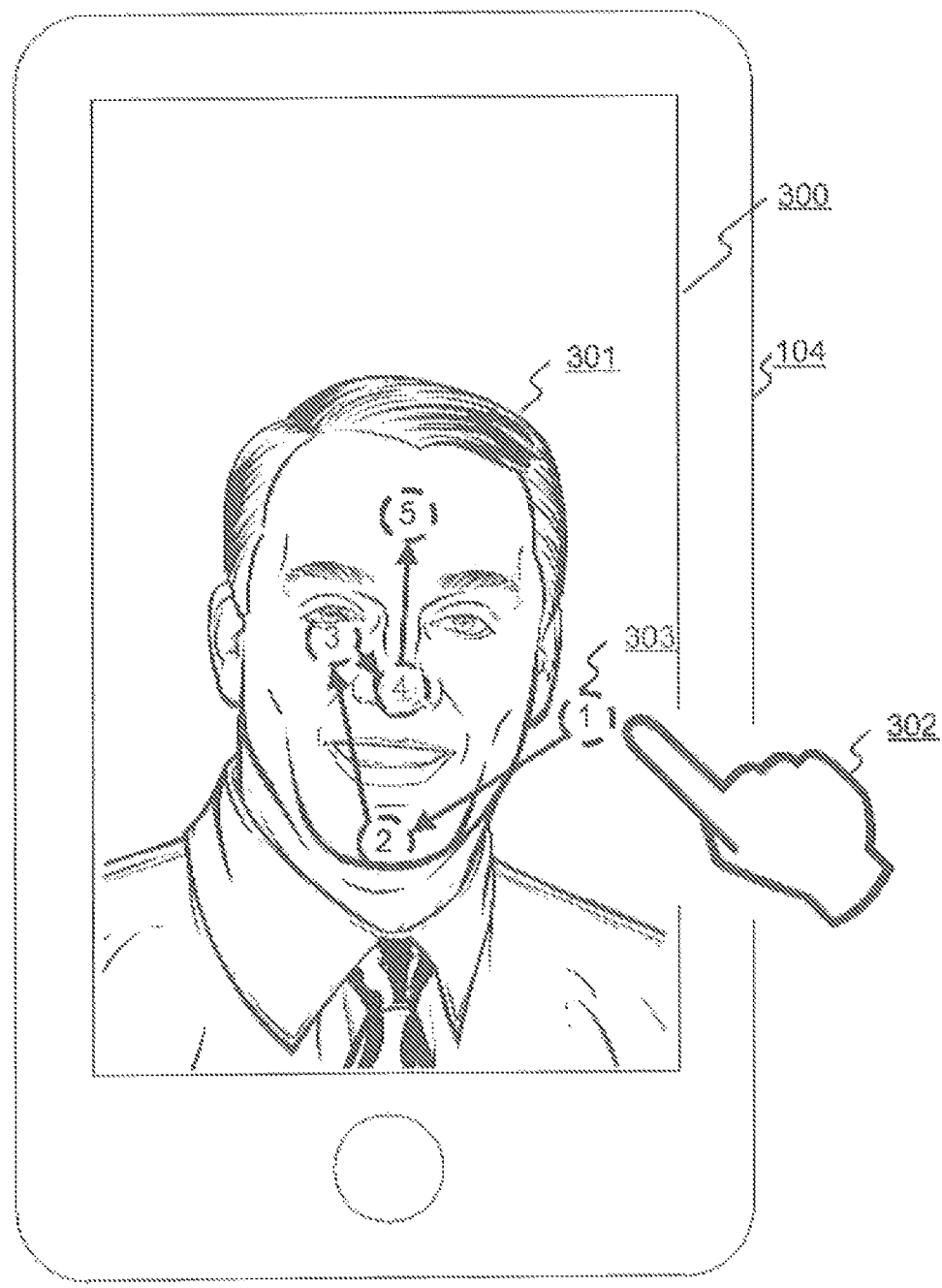
FIG. 3 illustrates an exemplary graphical user interface, consistent with disclosed embodiments.

In some embodiments, client device 104 may present the obtained digital image to user 110 through a corresponding display unit, such as a touchscreen display (e.g., in step 204). Client device 104 may also present a dialog box, pop-up window, or other interface element prompting user 110 to sequentially select facial and/or physical features within the presented image, which may establish an authentication sequence associated with the presented image (e.g., in step 206). In certain aspects, user 110 may "select" a facial or physical feature within the displayed digital image by establishing contact between a finger or stylus and a position on a surface of the touchscreen corresponding to the facial or physical feature. FIG. 3 illustrates an exemplary graphical user interface (GUI) 300 that, upon presentation to user 110, enables user 110 to establish an authentication sequence consistent with disclosed embodiments.

In FIG. 3, client device 104 may execute software instruction that present a digital image 301 to user 110 on a corresponding touchscreen display. Furthermore, client device 104 may present a dialog box, pop-up window, or other interface element prompting user 110 to sequentially select facial and/or physical features of user 110 within the presented image. In some aspects, using a finger 302, user 110 may select a sequence 303 of facial features within the presented image, which may establish the authentication sequence corresponding to the presented image. For instance, and as depicted in FIG. 3, sequence 303 may specify sequential contact established between finger 302 and positions on a surface of the touchscreen display corresponding to (1) a left ear, (2) a chin, (3) a right eye, (4) a nose, and (5) a forehead of user 110. In certain embodiments, "sequential selection" and/or information described as "sequential" may describe information that is entered or selected by user 110 in a particular order, such as, for example, the individual numbers that form a personal identification number (PIN).

The disclosed embodiments are, however, not limited to authentication sequences based on the exemplary facial features described above. In other aspects, client device 104 may be configured to prompt user 110 to provide input establishing an authentication sequence that include a predetermined number of facial and/or physical features and additionally or alternatively, a minimum number of facial and/or physical features. Further, in some instances, client device 104 may execute software instructions that require user 110 to sequentially select the facial and/or physical feature during a predetermined time period (e.g., thirty seconds).

In other instances, client device 104 may specify a number and/or nature of the sequentially selected facial features based on an expression of user 110 within the presented image. For example, client device 104 may process image data corresponding to the digital image (e.g., using one or more image processing techniques) to determine that user 110 is smiling within the presented digital image, or alternatively, in frowning within the presented digital image. In certain aspects, client device 104 may prompt user 110 establish the authentication sequence corresponding to digital image by sequentially selecting facial and/or physical features that exclude user 110's mouth or lips.

Further, in the embodiments described above, user 110 establishes the authentication sequence corresponding to the presented image based on discrete contacts between finger 302 (or a stylus) and positions on the touchscreen surface associated with corresponding ones of the facial and/or physical features (e.g., a single-touch selection). In other aspects, authentication sequences consistent with the disclosed embodiments may also include combinations of facial and/or physical features simultaneously selected by user 119 (e.g., a multi-touch selection). By way of example, and as described above, user 110 may establish an authentication sequence by: (i) simultaneously touching positions on the touchscreen surface corresponding to the left and right eyes; (ii) simultaneously touching surface on the touchscreen display corresponding to the left and right ears; (iii) touching a position on the touchscreen surface corresponding to the mouth; and (iv) touching a position on the touchscreen surface corresponding to the nose.

Referring back to FIG. 2, client device 104 may establish the corresponding authentication sequence by capturing information identifying user 110's sequential selection of the facial and/or physical features within the presented digital image (e.g., in step 208). In some embodiments, client device 104 may be configured (e.g., by executed software instructions) to perform image processing operations that identify portions of the presented image (e.g., pixels) that correspond to discrete facial features (e.g., user 110's eyes, ears, nose, mouth, chin, neck shoulders, etc.), and further, that map pixels of the presented image to positions on the surface of the touchscreen display. In certain aspects, client device 104 may execute software instructions that detect contact between user 110's finger or stylus and the touchscreen display (e.g., that corresponds to user 110's selection of one of the sequence of facial and/or physical features), that determine positions on the touchscreen surface corresponding to the detected contact, and further, that identify a portion of the presented image (e.g., a portion of pixels) that corresponds to the detected contact positions. Client device 104 may, in some aspects, be configured to determine a facial feature of user 110 associated with the detected contact based on a correspondence between the identified pixel portion and identified pixels corresponding to the facial and/or physical features.

In some embodiments, client device 104 may be configured to store authentication information identifying user 110, the presented digital image, and the sequentially selected facial and/or physical features corresponding to the authentication sequence in a data repository (e.g., in step 210). By way of example, client device 104 may be configured to store the authentication information in a locally accessible data repository (e.g., memory 115). In other aspects, client device 104 may be configured to store at least a portion of the authentication information in a data repository accessible to client device 104 across network 120. For instance, at least a portion of the authentication information may be stored within a data repository associated with system 140 (e.g., database 134) and/or in cloud-based data repositories 170.

In some aspects, client device 104 may be configured to store the authentication information in one or more data records that link user 110 with the presented digital image (e.g., as a first biometric factor in a two-factor authentication process) and the captured authentication sequence (e.g., as a second, user-defined factor in the two-factor authentication process). Further, in certain instances, the stored authentication information may include the detected contact positions (e.g., on the surface of the touchscreen display) associated with the selected facial and/or physical features, data indicative of the portions of the presented image corresponding to the selected facial and/or physical features, and additionally or alternatively, information identifying the selected facial and/or physical features (e.g., nose, ears, eyes, mouth, etc.).

Client device 104 may also be configured to establish a user profile corresponding to user 110 and the stored authentication information (e.g., in step 212). Client device 212 may be configured to associate the established user profile with user 110 and the established authentication sequence, and store information associated with the user profile in a data repository locally accessible to client device 104 (e.g., memory 115) and/or accessible to client device 104 across network 120. In some aspects, client device 104 may perform processes that store the user profile information in cloud-based data repository 170, which may be accessible to client device 104, system 140, and other client devices and systems across network 120, Exemplary process 200 is then complete in step 214.

In some embodiments, the user profile may include data establishing permissions that enable user 110 to access functionalities of client device 104, to access and execute applications (e.g., "mobile apps") stored on client device 104, and further, to access functionalities of one or more of the mobile apps. By way of example, when establishing the authentication sequence based on the sequentially selected facial and/or physical features (e.g., in steps 206 and 208), client device 104 may also establish profile data that provides no restriction on user 110's ability to access functions and/or mobile apps on client device 104. In other aspects, client device 104 may execute software instructions that allow user 110 to generate an authentication sequence for another user (e.g., a child), link that generated authentication sequence to an image of the child, and further, generate profile data for the child that limits the child's access to certain mobile apps (e.g., stored games) and prevents the child from transmitting and sending data across network 120.

In some embodiments, the exemplary processes described above may enable user 110 to generate and associate multiple authentication sequences and user profiles with a single digital image. For instance, user 110 may establish a first authentication sequence and link the first authentication sequence to a first user profile enabling user 110's access to all functionalities of client device 104 and all mobile apps stored on client device 104. In other instances, user 110 may establish a second authentication sequence linked to a second user profile that limits user 110's access to functions and mobile apps that transmit and receive data across mobile telecommunications communications networks. By way of example, when travelling in a home geographic region, user 110 may access client device 104 using the first authentication sequence and in accordance with the first user profile. When travelling abroad, however, user 110 may access client device 104 using the second authentication sequence and in accordance with the second user profile to limit roaming charges due to unexpected data transfer.

Further, in certain instances, the user profile information may include data indicative of a current state of client device 104. For instance, client device 104 may store preference data (e.g., user preferences, screen layout, etc.) established by user 110 and configuration data associated with one or more applications executed by client device 104 (e.g., authentication credentials for email applications, server data, IP addresses etc.). In some aspects, the user profile information may include at least a portion of the configuration and preferences data such that, when user 110 authenticates an identity on a device other than client device 104, the other device (and applications executed by the other device) may operate in accordance with the configuration and preference data. By way of example, the user profile information that includes the configuration and/or preference data may be stored in a cloud-based data repository accessible to client device 104, system 140, and other devices and systems across network 120.

In the embodiments described above, a user (e.g., user 110) may provide input to a client device (e.g., client device 104) identifying a set of sequentially selected facial and/or physical features within a presented self-image. In some aspects, client device 104 may execute software instructions that establish an authentication sequence corresponding to the selected facial and/or physical features (e.g., based on the positions of the facial and/or physical features within the presented self-image and the touchscreen display of client device 104). Further, as described above, client device 104 may be configured to store authentication information associating user 110, the presented self-image, and the authentication sequence in a corresponding data repository (e.g., memory 115, database 143, and/or other accessible cloud-based repositories). In further embodiments, described below in reference to FIG. 4, the stored authentication information (e.g., the stored image and authentication sequence) facilitate a subsequent multi-factor authentication of user 110 in response to one or more events that require authentication of user 110's identity.

Figure 4:
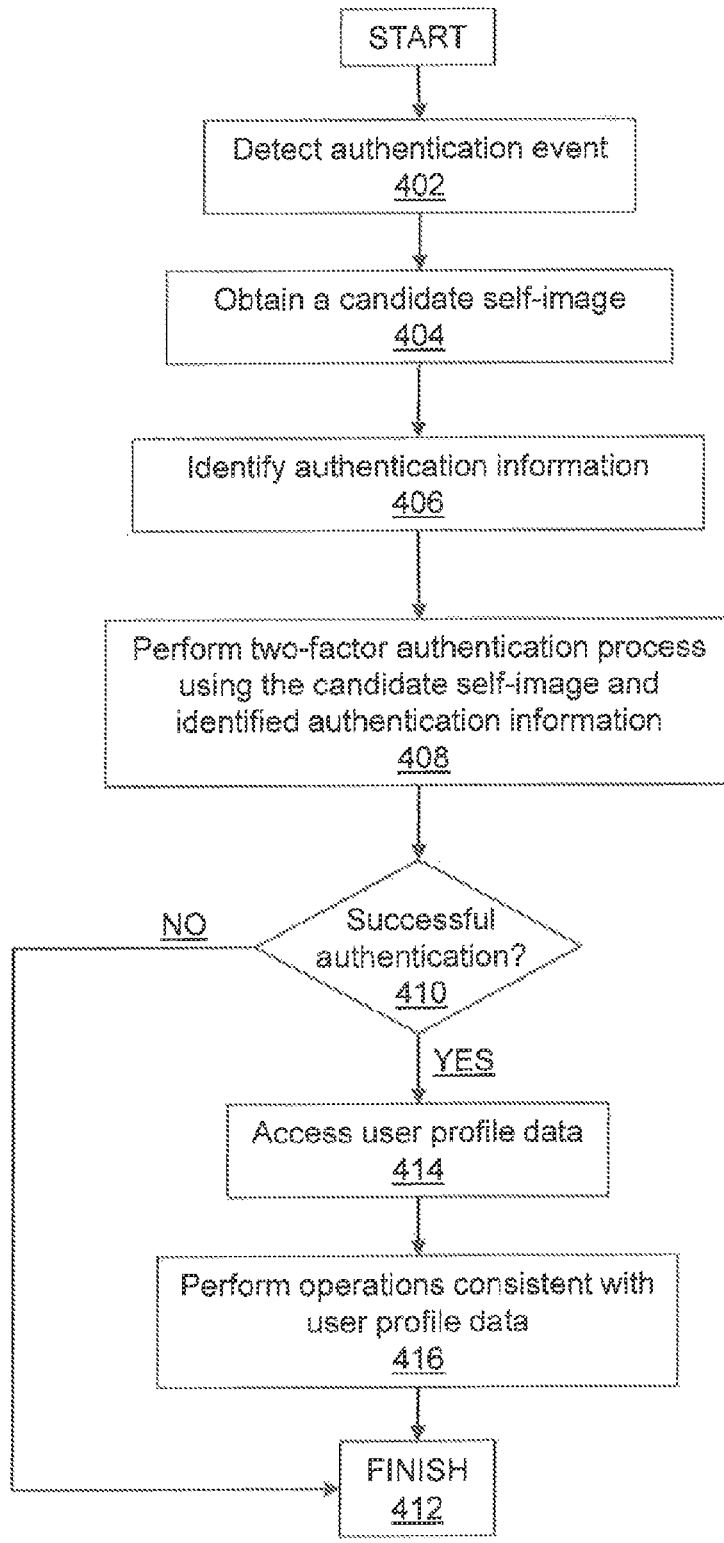
FIGS. 4 and 5 are flowcharts of exemplary two-factor authentication processes, consistent with disclosed embodiments.

FIG. 4 is a flowchart of an exemplary process 400 that enables a client device to perform two-factor authentication of a user based on a reference self-image and reference authentication sequence previously established by the user, in accordance with disclosed embodiments. In one embodiment, client device 104 may detect or identify an event requiring an authentication of user 110's identify, and in response to the detected authentication event, client device 104 may obtain a digital image including at least a portion of user 110's face (e.g., a "candidate" self-image of user 110). Upon presenting the candidate self-image to user 110 on a touchscreen display, client device 104 may be configured to prompt user 110 to select facial and/or physical features within the presented candidate self-image (e.g., to touch corresponding positions on a surface of the touchscreen display) in accordance with a sequence previously established by user 110. In certain aspects, client device 104 may be configured to capture information identifying the sequentially selected features, and may establish a candidate authentication sequence based on the captured information. Based on a comparison of the candidate authentication sequence with a reference authentication sequence associated with the candidate self-image, client device 104 may authenticate user 110's identity, and further perform operations consistent with profile data associated with user 110.

In FIG. 4, client device 104 may detect an authentication event associated with user 110 and/or client device 104 (e.g., in step 402). In some aspects, authentication events consistent with the disclosed embodiments may include a modification in a state of client device 104 (e.g., a transition from a locked to an unlocked state, a transition from an inactive to an active state, a modification of a configuration or setting, etc.). For example, client device 104 may recognize an attempt by user 110 to unlock client device 104, and may establish the recognized attempt as an authentication event in step 402.

In other aspects, the authentication event may include an attempt or request by user 110 to access a secure website or digital portal provided by system 140 and associated with business entity 130 (e.g., an e-commerce retailer, a financial institution, an academic institution, a governmental entity, etc.). Further, in certain aspects, the authentication event may be programmatically triggered by the secure website and/or digital portal. For example, a digital portal associated with an e-commerce retailer (e.g., Amazon.com™) may request, through a corresponding API, that client device 104 execute instructions that perform a multi-factor authentication of user 110 prior to completion of a purchase transaction. In other instances, a web page associated with a financial institution may, after an initial authentication of user 110's identify, request through a corresponding API that client device 104 execute instructions that perform an additional multi-factor authentication of user 110 prior to execution of a financial services transaction, such as a bill payment or an electronic funds transfer.

In response to the detected authentication event, client device 104 may be configured to obtain a candidate self-image associated with user 110 (e.g., in step 404). In certain aspects, client device 104 may include a digital camera (e.g., a front-facing camera) capable to capturing digital images and/or digital video. By way of example, the candidate self-image may include a digital self-image of user 110's face and/or upper torso (e.g., a "selfie" taken by holding client device 104 at a distance from the user 110's upper torso and face), and user 110 may provide input to client device 104 to capture the candidate self-image.

In other aspects, client device 104 may be configured to access digital video composed of a plurality of individual frames (e.g., captured by the front-facing camera of client device 104), and to select the digital image from the individual frames. For example, client device 104 may be configured to identify a corresponding one of the individual frames that includes at least a predetermined number of facial and/or physical features of user 110's face and/or torso, and establish the corresponding one of the identified frames as the selected digital image. In other aspects, client device 104 may be configured to identify a corresponding one of the individual frames that includes at least a predetermined portion of user 110's face (e.g., 50% of user 110's face, a portion of the face extending above user 110's chin, etc.), and establish the corresponding one of the identified frames as the selected digital image.

In certain aspects, client device 104 may obtain authentication information associated with one or more potential users of client device 104 (e.g., in step 406). For example, and as described above, authentication information for a particular potential user (e.g., user 110) may include information identifying user 110 (e.g., a user name, a password, etc.), a previously captured reference self-image of user 110, and further, a sequence of facial and/or physical features selected by user 110 within the reference self-image (e.g., a reference authentication sequence). In certain aspects, the reference authentication sequence may be specific to the reference self-image, and as described above, user 110 may have previously established the reference authentication sequence based on a presentation of the reference self-image to user 110 by client device 104 (e.g., on a touchscreen display). Further, in some embodiments, client device 104 may obtain the authentication information of a data repository locally accessible to client device 104 (e.g., memory 115) and additionally or alternatively, from a data repository accessible to client device 104 across network 120 (e.g., database 144 and/or could-based data repository 170).

By way of example, the reference authentication sequence may specify that user 110 sequentially selected regions of the presented reference self-image corresponding to user 110's left ear, chin, a right eye, a nose, and a forehead. Further, for example, user 110 select a region of the presented reference self-image corresponding to a facial and/or physical feature (e.g., user 110's left ear) by establishing contact between a finger or stylus and a surface of the touchscreen display at a position corresponding to the user 110's left ear. In some aspects, the authentication information may further identify, for corresponding ones of the selected regions (and thus, the selected facial and/or physical features), display positions on the touchscreen surface and portions of the presented digital image (e.g., pixel portions) that correspond to the selected regions.

In some embodiments, client device 104 may be configured to perform a two-factor authentication process that authenticates and verifies an identity of user 110 (e.g., in step 408). By way of example, two-factor authentication processes consistent with the disclosed embodiments may apply facial recognition techniques to ensure that the subjects of the candidate and reference self-image match and correspond to user 110. When the candidate and reference self-image match and correspond to user 110, client device 110 may be configured to present the candidate self-image to user 110 via a touchscreen display, and to prompt user 110 to select, within the candidate self-image, a sequence of facial and/or physical features previously established by user 110. As described below in reference to FIG. 5, client device 104 may be configured to authenticate and verify user 110's identity based on a comparison of the sequentially selected features of the candidate self-image with a reference authentication sequence associated with the candidate self-image.

Figure 5:
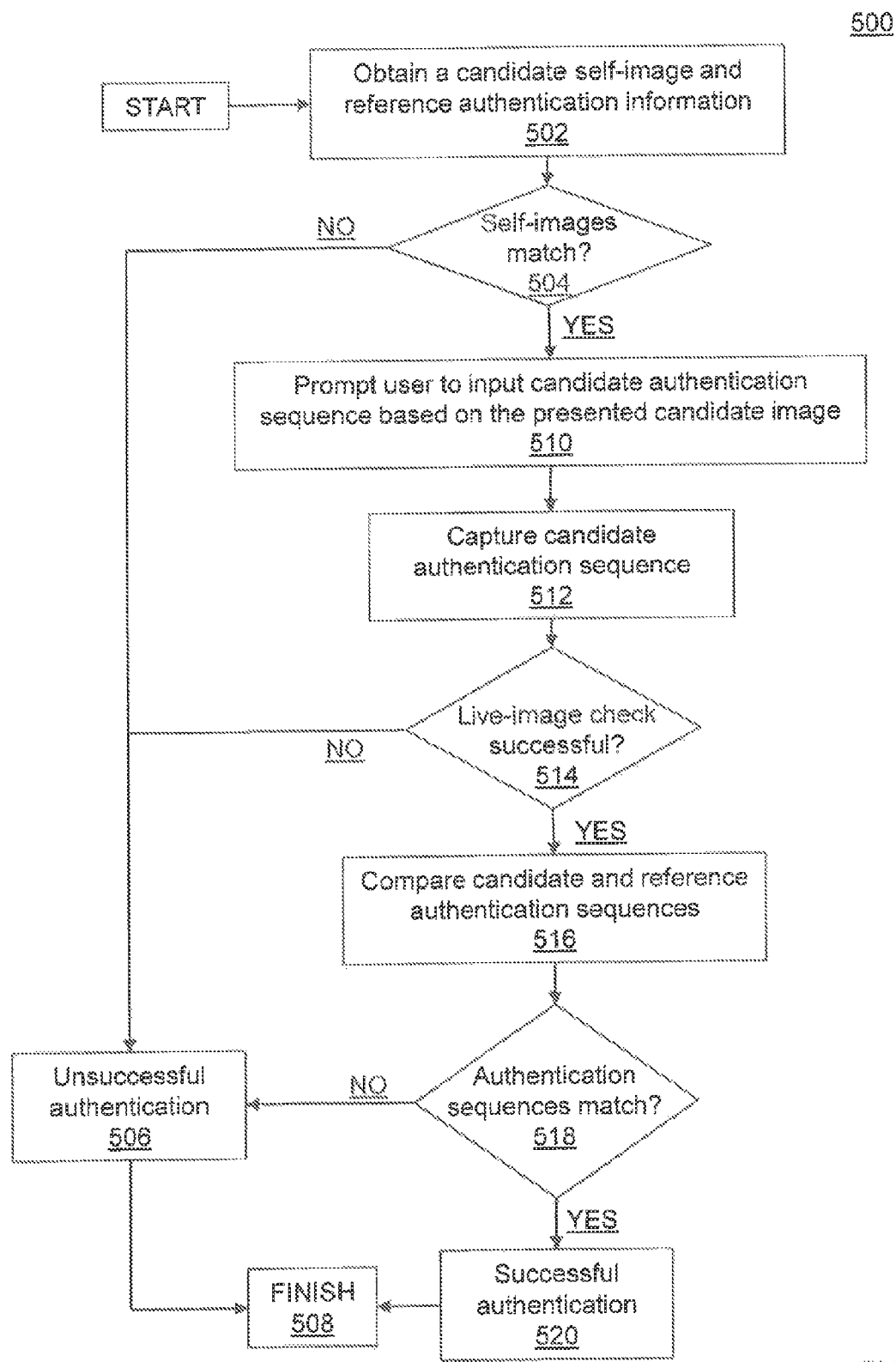

FIG. 5 is a flowchart of an exemplary two-step authentication process 500, consistent with disclosed embodiments. In one embodiment, a client device (e.g., client device 104) may be configured to authenticate and verify an identity of a user (e.g., user 110) based on a first biometric authentication factor (e.g., a correspondence between candidate and reference self-images of user 110) and a second authentication factor corresponding to a selection of a previously established sequence of facial and/or physical features within the candidate self-image of user 110.

In FIG. 5, client device 104 may be configured to obtain candidate self-image data and authentication information associated with user 110 (e.g., in step 502). By way of example, and as described above, user 110 may provide input to client device 104 to capture the candidate self-image using a front-facing digital camera of client device 104. In certain aspects, the candidate self-image may include a digital self-image of user 110's face and/or upper torso (e.g., a "selfie" taken by holding client device 104 at a distance from the user 110's upper torso and face). In other aspects, client device 104 may be configured to access digital video composed of a plurality of individual frames (e.g., captured by the front-facing camera of client device 104), and to select the candidate self-image from the individual frames. Further, in some embodiments, the obtained authentication information for user 110 may include information identifying user 110, a previously captured reference self-image of user 110, and further, a sequence of facial and/or physical features selected by user 110 within the reference self-image (e.g., a reference authentication sequence).

In step 504, client device 104 may be further configured to determine whether a subject of the candidate self-image (e.g., the user captured by the digital camera in response to the detected authentication event) corresponds to user 110 (e.g., as depicted in the reference self-image). By way of example, client device 104 may be configured to determine whether the subject of the candidate self-image matches the reference self-image of user 110 based on facial recognition algorithms that identify compare facial features within the candidate and reference self-images (e.g., the center of pupils, the inside corner of eyes, the outside corner of eyes, point of widows peak, etc.). Client device 104 may, in some aspects, compute differences between the spatial coordinates of the facial features within the candidate and reference self-images, and when the at least a portion of the computed differences fall below a predetermined threshold value, client device 104 may establish that the subject of the candidate self-image corresponds to user 110, as depicted in the reference self-image.

If client device 104 were to determine that the subjects of the candidate and reference self-images do not match and correspond to user 110 (e.g., step 504; NO), client device 104 may deem the two-factor authentication of user 110's identity unsuccessful (e.g., in step 506). In certain aspects, client device 104 may be configured to pass the unsuccessful outcome of the back to step 408 of exemplary process 400, and exemplary process 500 is complete in step 508.

If, however, client device 104 were to determine that the subject of the candidate self-image corresponds to user 110 (e.g., step 504; YES), client device 104 may present, to user 110 on a touchscreen display, the candidate self-image and a dialog box, pop-up window, or other interface element prompting user 110 to select facial and/or physical features within the presented candidate self-image in accordance with an authentication sequence previously established by user 110 (e.g., in step 510). In some aspects, the previously established authentication sequence may be uniquely associated with and known only to user 110, and may provide a second authentication factor that supplements the first biometric authentication factor (e.g., the correspondence between the subjects of the candidate and reference self-images).

In response to the presented prompt, user 110 may sequentially select facial and/or physical features within the presented candidate self-image in accordance with user 110's previously established authentication sequence. For instance, user 110 may have knowledge that his or her previously established authentication sequence includes an ordered selection of user 110's left ear, chin, right eye, nose, and forehead. In some aspects, user 110 may select a corresponding sequence of facial features (e.g., left ear, chin, right eye, nose, and forehead) within the presented candidate self-image by establishing contact (e.g., using a finger or a stylus) within portions of the touchscreen that present corresponding ones of the facial features.

In some embodiments, client device 104 may be configured to detect the established contact, and capture information identifying user 110's sequential selection of the facial and/or physical features within the presented candidate self-image to establish a candidate authentication sequence (e.g., in step 512). By way of example, and as noted above, client device 104 may perform image processing operations that identify portions of the presented candidate image (e.g., pixels of the presented image) that correspond to discrete facial features (e.g., user 110's eyes, ears, nose, mouth, chin, neck, shoulders, etc.), and further, that map pixels of the presented candidate self-image to positions on the surface of the touchscreen display. In certain aspects, client device 104 may execute software instructions that determine positions on the touchscreen surface corresponding to the detected contact, and further, establish the candidate authentication sequence based on the facial and/or physical features within the candidate self-image that correspond to the detected contact.

Client device 104 may be further configured to perform access the front-facing digital camera to perform a "live image check" that determines whether the candidate self-image represents an image of a living person, and not a photograph of an authorized person (e.g., in step 514). For example, although the front-facing camera may freeze the obtained candidate self-image to facilitate input of user 110's authentication sequence, the front-facing camera may continue to sample its field-of-view and obtain additional digital image data. In some aspects, client device 104 may be configured to process the additional digital image data using image processing techniques and facial recognition techniques to detect indicia of motion of user 110, which include, but are not limited to, blinking, eye motion, lip movement, and other facial or bodily movements.

If the live-image check were unsuccessful, and client device 104 detects no indicia of facial or body movement within the captured image data (e.g., step 514; NO), client device 104 may deem the two-factor authentication of user 110's identity unsuccessful (e.g., in step 506). In some aspects, the lack of facial or bodily movement in the captured subject may be indicative of an attempt by an unauthorized user to fraudulently access client device 104, and additionally or alternatively, one or more stored applications, by photographing an image of an authorized user (e.g., user 110) using the front-facing camera. In certain aspects, client device 104 may be configured to pass the unsuccessful outcome of the back to step 408 of exemplary process 400, and exemplary process 500 is complete in step 508.

If, however, client device 104 identifies indicia of facial and/or body movement, client device may deem the live-image check successful (e.g., step 514; YES), client device 104 may execute software instructions that compare the candidate authentication sequence and the reference authentication sequence (e.g., in step 516). In certain aspects, client device 104 may establish an association between the reference authentication sequence and the candidate self-image based on a correspondence between the subjects of the candidate and reference self-images. In other aspects, client device 104 may establish that the candidate and reference authentication sequences include a common number of selected facial and/or physical features, and further, may establish matches between corresponding pairs of selected facial and/or physical features within the candidate and reference authentication sequences.

If client device 104 determines that the selected facial and/or physical features associated with the reference authentication sequence correspond to the facial and/or physical features associated with the candidate authentication sequence (e.g., step 518; YES), client device 104 may deem the two-factor authentication of user 110's identity successful (e.g., in step 520). By way of example, and as described above, user 110 may have previously established the reference authentication sequence by selecting, in order, a left ear, a chin, a right eye, a nose, and a forehead of the reference self-image. If user 110 also selected a left ear, a chin, a right eye, a nose, and a forehead within the candidate self-image (e.g., in steps 510 and 512), client device 104 may determine that the reference authentication sequence matches the candidate authentication sequence (e.g., in step 518), and may deem the authentication successful (e.g., in step 520). In certain aspects, client device 104 may be configured to pass the successful outcome of the back to step 408 of exemplary process 400, and exemplary process 500 is complete in step 508.

If, however, client device 104 determines that the selected facial and/or physical features associated with the reference authentication sequence do not correspond to the facial and/or physical features associated with the candidate authentication sequence (e.g., step 518; NO), client device 104 may deem the two-factor authentication of user 110's identity successful (e.g., in step 506). By way of example, if user 110 selected a left ear, a mouth, a right eye, a nose, and a forehead within the candidate self-image, client device 104 may determine that the reference authentication sequence does not match the candidate authentication sequence (e.g., in step 518), and may deem the authentication unsuccessful (e.g., in step 506). In certain aspects, client device 104 may be configured to pass the successful outcome of the back to step 408 of exemplary process 400, and exemplary process 500 is complete in step 508.

Referring back to FIG. 4, client device 104 may be configured to determine whether the two-factor authentication process (e.g., as applied in step 408) successfully authenticated and verified user 110's identity (e.g., in step 410). If client device 110 were unable to authenticate and verify user 110's identity (e.g., step 410; NO), then the exemplary authentication process 400 is complete in step 412. For example, as described above, the exemplary two-factor authentication process may fail in response to a mismatch between the subject of the candidate and reference self-images, a failure of a live-image check, and/or a mismatch between a candidate authentication sequence entered by user 110 and a previously established reference sequence.

If, however, client device 110 successful authenticates and verifies user 110's identify (e.g., step 410; YES), client device 104 may be configured to access profile data associated with user 110 (e.g., in step 414). By way of example, client device 104 may obtain the user profile data from a locally accessible data repository (e.g., memory 115), a data repository associated with system 140 (e.g., database 144), and/or cloud-based data repository 170. In some embodiments, and as described above, the accessed user profile may include information establishing one or more permissions that enable user 110 to access functionalities of client device 104, to access and execute executable applications (e.g., "mobile apps") stored on client device 104, and further, to access functionalities of one or more of the mobile apps. The accessed user profile may also specify preference data (e.g., user preferences, screen layout, etc.) established by user 110 and configuration data associated with one or more applications executed by client device 104 (e.g., authentication credentials for email applications, server data, IP addresses etc.).

Client device 104 may also be configured to and perform operations consistent with the accessed user profile data (e.g., in step 416). For example, in response to a successful two-factor authentication of user 110, client device 104 may execute software instructions (e.g., associated with an operating system) to modify an operational state of client device 104 (e.g., a transition from a locked to an unlocked state, a transition from an inactive to an active state, a modification of a configuration or setting, etc.). For example, client device 104 may recognize an attempt by user 110 to unlock client device 104, and in response to a successful two-factor authentication, may execute software instructions that unlock client device 104 and facilitate user 110's access to one or more store applications in accordance with the permissions, preferences, and configurations set forth in the accessed user profile.

In other aspects, as described above, the operations performed by client device 104 (e.g., in step 416) may facilitate user 110's access to a secure website or digital portal provided by system 140 and associated with business entity 130 (e.g., an e-commerce retailer, a financial institution, an academic institution, a governmental entity, etc.). For instance, upon receipt of a request from client device 104 to access the secure website or digital portal, client device 110 may perform the exemplary two-factor authentication processes outlined above to authenticate and verify user 110's identity prior to granting user 110 access to the secure website or digital portal.

In further aspects, client device may perform operations (e.g., in step 416) in response to a request received programmatically from a system associated with an e-commerce retailer, financial institution, governmental entity, or other business entity through a corresponding API. For example, a digital portal associated with an e-commerce retailer (e.g., Amazon.com™) may request, through a corresponding API, that client device 104 execute instructions that perform a two-factor authentication of user 110 prior to completion of a purchase transaction. In other instances, a web page associated with a financial institution may, after an initial authentication of user 110's login credentials, request through a corresponding API that client device 104 execute instructions that perform an additional two-factor authentication of user 110 prior to execution of a financial services transaction, such as a bill payment or an electronic funds transfer.

In other aspects, the disclosed embodiments may facilitate an establishment of multiple user profiles that enable multiple users to access a single client device (e.g., client device 104) in accordance with permissions, preferences, and configurations set forth in corresponding user profiles. For instance, the disclosed embodiments may allow an owner of client device 104 (e.g., user 110) to establish a reference authentication sequence based on a sequential selection of user 110's facial and/or physical features in a reference self-image, and to establish user profile data that enables user 110 to access all functions of and applications stored on client device 104. In further aspects, client device 104 may execute software instructions that generate, for one or more additional users identified by user 110, corresponding reference self-images, reference authentication sequences, and user profiles that, upon successful two-factor authentication, enable the additional users to access at least a subset of the functions of and the applications stored on client device 104. User 110 may, in some instances, establish the subsets of the functions and functions accessible to the additional users by defining permissions, settings, and/or configurations in the corresponding user profile data.

For example, user 110, through client device 104, may enable a close friend to establish authentication information (e.g., a corresponding reference self-image and reference authentication sequence) that facilitates the close friend's access to client device 104 subject to the permissions, settings, and/or configurations in the corresponding user profile data. In some aspects, user 110 may establish permissions in the corresponding user profile data that prevent the close friend from accessing user 110's email application. Thus, when client device 110 successfully authenticates the close friend's identity using the techniques outlined above, the close friend may be able to use all functions and applications present on client device 104 except user 110's email application.

In other instances, user 110 may establish a user profile and corresponding authentication credentials for one or more of user 110's children. User 110 may, through an interface presented by client device 104, define user profile data for the child that allows the child to access gaming applications present on client device 104, and further, that prevents the child from accessing telecommunications functions of client device 104. In certain embodiments, upon a successful two-factor authentication of the child, the child may access client device 104 in accordance with the permissions and application configuration set forth in the corresponding user profile data.

In some aspects, client device 104 may store the user profiles and reference authentication information for user 110 and the additional users in a locally accessible data repository (e.g., memory 115). In other aspects, the user profiles and reference authentication information may be stored within an external data repository (e.g., database 134 of system 140 or an additional cloud-based data repository) accessible across client device 104. For instance, by storing the user profiles and reference authentication information in the cloud-based data repository, user 110 (and additionally or alternatively, one or more of the additional users) may execute a mobile application on an additional client device to access the corresponding user profile and reference authentication information and perform the exemplary two-factor authentication processes outlined above.

In the embodiments described above, client device 104 may be configured to authenticate of user 110's identity based on, among other things, facial and/or physical features of user 110 selected from a candidate self-image in accordance with a sequence previously established by user 110. In further embodiments, the exemplary two-factor authentication processes describe above may authenticate user 110's identity based on facial and/or physical features of user 110 selected, in accordance with a previously established sequence (e.g., a third selection sequence), from a captured and/or streaming digital video that includes a face and upper torso of user 110. For instance, client device 104 may parameterize the selected facial and/or physical features based not only on display positions of the selected facial and/or physical features within the touchscreen display, but also on the basis of temporal positions of the selected facial and/or physical features within the video stream. In certain aspects, authentication processes based on captured and/or streaming digital video content may reduce an ability of an unauthorized user to fraudulently access client device 104, and additionally or alternatively, one or more stored applications, by photographing an image of an authorized user (e.g., user 110) using the front-facing camera.

In further embodiments, the exemplary two-factor authentication processes may also authenticate and verify an identity of user 110 (and of other users) based on location-based data detected by client device 110 and/or received from an external positioning system. For instance, client device 104 may execute software instructions that determine current geographic position of client device 104, and further, that interface with a mapping service provided by an external system or server (not depicted in FIG. 1) to identify one or more physical retailers or landmarks disposed proximate to the geographic position of client device 104. In some aspects, and upon detection of an authentication event, client device 104 may present a dialog box, pop-up window, or other interface element prompting user 110 to capture a candidate self-image that includes at least a portion of one of the physical retailers or landmarks. Furthermore, prior to when selecting the facial and/or physical features in accordance with the previously established sequence, client device 104 may also be configured to prompt user 110 to select at portion of the physical retailer or landmark.

In other instances, client device 104 may be configured to determine, based on geographic information, that user 110 frequently accesses client device 104 in high-crime areas that experience increased risks of device theft. In some aspects, client device 104 may require user 110 to establish a reference sequence having a larger number of sequentially selected facial and/or physical regions than would be required if user 110 accessed client device 104 in geographic areas having reduced levels of crime and/or device theft.

In the embodiments described above, client device 104 may be further configured to perform a "live image check" that determines whether the candidate self-image represents an image of a living person, and not a photograph of an authorized person based on, for example, identified indicia of facial and/or body movement, client device may deem the live-image check successful (e.g., in step 514 of FIG. 5). The disclosed embodiments are, however, not limited to such exemplary live-image checks, and in additional embodiments, client device 104 may be configured to perform a live-image check based on a time at which a digital camera captured the candidate self-image (e.g., a digital camera associated with client device 104 or another camera), or a presentation time within a digital video stream associated with the candidate self-image.

For example, client device 104 may be configured to process image data associated with a candidate self-image to identify a corresponding time of capture (e.g., a first time). Client device 104 may also be configured to determine a time at which client device 102 presented the candidate self-image to user 110 using the touchscreen display. In certain aspects, a live-image check may be successful when a temporal difference between the first and second times is determined by client device 104 not to exceed a threshold value (e.g., one minute, five minutes, thirty minutes, one hour, etc.). In some aspects, the threshold value may be established by system 140, and may reflect one or more policies or procedures establish by business entity 150 to mitigate fraudulent access to device 104 and/or corresponding data. Client device 104 may, in one embodiments, authenticate and verify user 110's identity when the selected facial and/or physical features associated with the reference authentication sequence correspond to the facial and/or physical features associated with the candidate authentication sequence, and further, when the temporal difference between the first and second times is determined not to exceed a threshold value.

Further, as described above, client device 104 may be configured to capture digital image data and/or digital video data received from a digital camera (e.g., the front-facing digital camera of client device 104). Further, in certain embodiments, client device 104 may be configured to obtain first and second temporal information from an external system in communication with the client device 104 over a communications network 120. For instance, the first temporal information may specify a first time provided by the external system, and client device 104 may be configured to obtain the first temporal data from the external system prior to causing the digital camera to capture the candidate self-image. In other instances, the second temporal information may specify a second time provided by the external system, and client device 104 may be configured to obtain the second temporal data from the external system subsequent to causing the digital camera to capture the candidate self-image. By way of example, the external system may correspond to a computer system or server associated with an academic or governmental entity that distributes temporal information provided by an atomic clock.

In certain aspects, a live-image check may be successful when a temporal difference between the first and second time stamps is determined by client device 104 not to exceed a threshold value. In other aspects, client device 104 may be configured to process image data associated with a candidate self-image to identify a corresponding time of capture (e.g., a third time). Client device 104 may, for example, establish a successful live-image check when the identified third time falls within a temporal interval established by the obtained first and second times. In one embodiment, client device 104 may be configured to authenticate and verify user 110's identity when the selected facial and/or physical features associated with the reference authentication sequence correspond to the facial and/or physical features associated with the candidate authentication sequence, and further, in response to a successful live-image check of the candidate self-image.

In some embodiments, as described above, the exemplary two-factor authentication processes outlined above may authenticate and verify user 110's identity when a subject of a candidate self-image matches a subject of a reference self-image, and further, when the selected facial and/or physical features associated with the reference authentication sequence correspond to the facial and/or physical features associated with the candidate authentication sequence. The disclosed embodiments are, however, not limited to authentication processes that match the candidate and reference self-images, the facial and/or physical features sequentially selected from the candidate and reference self-images, and the sequences with which user 110 selected the facial and/or physical features to authenticate and verify user 110's identity. In certain aspects, authentication processes consistent with the disclosed embodiments may authenticate and verify user 110's identity based on determined matches between the facial and/or physical features sequentially selected from the candidate and reference self-images, either alone or in conjunction with a determined match between the candidate and reference self-images and/or a determined match between the sequences with which user 110 selected the facial and/or physical features.

In other aspects, and in addition to matching subjects within candidate and reference self-images, client device 104 may also authenticate and verify user 110's identity in response to a determination that the candidate self-image includes a portion of user 110's face, and not a portion of faces of any additional or alternate users. For instances, client device 104 may execute software processes that image processing and facial recognition techniques to the candidate self-image data to determine whether the candidate self-image include a portion of user 110's face and portions of faces of any additional or alternate users. If client device 104 were to determine that the candidate self-image does not include images of faces of additional or alternate users, client device 104 may be configured to authenticate and verify user 110's identity user the exemplary techniques described above. In some aspects, authentication techniques that confirm the candidate self-image includes one a portion of user 110's effect may reduce fraudulent activity and potential shoulder surfing.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A communications device, comprising:
a digital camera;
a touchscreen display unit;
a storage device; and
at least one processor coupled to the storage device, the touchscreen display unit, and the digital camera, the storage device storing software instructions for controlling the at least one processor when executed by the at least one processor, and the at least one processor being operative with the software instructions and configured to:
present first digital image data using the touchscreen display, the first digital image data identifying at least a portion of a first reference face of a first user, and the first digital image data being received from the digital camera;
identify pixels of the presented first digital image data that correspond to features of the first reference face and generate data that maps the identified pixels and the corresponding features to spatial positions on a surface of the touchscreen display unit;
receive, through the touchscreen display unit, information identifying a sequential selection of portions of the first digital image data by the first user, the received information associating the sequentially selected portions of the first digital image data with corresponding contact positions on the surface of the touchscreen display unit;
based on the generated data, identify the features of the first reference face that correspond to the contact positions;
determine that a first selection sequence of the identified features matches a second selection sequence associated with the first digital image; and
authenticate an identity of the first user, when the first selection sequence is determined to match the second selection sequence,
wherein the second selection sequence comprises a first authentication sequence or a second authentication sequence,
wherein the first user establishes the first authentication sequence and associates the first authentication sequence with a first user profile, the first user profile enabling the first user to access functionalities of client device and executable applications stored within the storage device,
wherein the first user establishes the second authentication sequence and associates the second authentication sequence with a second user profile, the second user profile limiting an access of the first user to one or more of the functionalities and the mobile applications that transmit or receive data across a mobile communications network, and
wherein the first and second user profiles are associated with the first digital image.

2. The communications device of claim 1, wherein the at least one processor is further configured to:
receive digital video data of the first user from the digital camera;
identify a plurality of frames of the received digital video data that include portions of the first reference face; and
establish one of the identified frames as the first digital image data.

3. The communications device of claim 1, wherein the at least one processor is further configured to establish a corresponding one of the identified frames as the first digital image data, the corresponding one of the identified frames including a corresponding portion of the first reference face exhibiting a predetermined feature.

4. The communications device of claim 1, wherein the at least one processor is further configured to:
present, to the first user, digital video data received from the digital camera, the presented digital video content comprising a plurality of frames;
receiving information identifying portions of the frames selected sequentially by the first user, the frame portions being associated with the identified features of the first reference face and temporal positions within the obtained digital video; and
authenticate the first user identity based on the sequentially selected frame portions.

5. The communications device of claim 1, wherein the at least one processor is further configured to:
identify a first time at which the digital camera captured the first digital image data and a second time at which the touchscreen display presented the first digital image data to the first user, the first time being identified from the first digital image data;
determining whether a temporal difference between first and second times exceeds a threshold value; and
authenticate the first user identity, when the temporal difference is determined not to exceed the threshold value, and when the first selection sequence is determined to match the second selection sequence.

6. The communications device of claim 1, wherein the at least one processor is further configured to detect an event triggering a capture of the first digital image data, the detected event comprising at least one of (i) a disposition of at least the first reference face within a field-of-view of the digital camera, (ii) an electronic signal received from one or more additional devices, (iii) an expiration of an established time period, (iii) input data received by the communications device from the first user, or (iv) data indicating that the first user holds the communications device.

7. The communications device of claim 6, wherein the at least one processor is further configured to:
in response to the detected triggering event, generate an electronic command that causes the digital camera to capture the first digital image data; and
obtain, from a system in communication with the communications device over a corresponding network, (i) first temporal information prior to causing the digital camera to capture the first digital image data and (ii) second temporal information subsequent to causing the digital camera to capture the first digital image data, the first temporal information specifying a first time, and the second temporal information specifying a second time.

8. The communications device of claim 1, wherein the at least one processor is further configured to:
determine whether the first digital image data includes at least a portion of a second reference face; and
perform the processes that authenticate the first user identity, when the first digital image data is determined not to include the portion of the second reference face, and when the first selection sequence is determined to match the second selection sequence.

9. The communications device of claim 1, wherein the features include at least one of an anatomical or a facial feature that distinguishes the first user from a plurality of second users.

10. The communications device of claim 1, wherein the facial feature includes a left eye, a right eye, a left ear, a right ear, a nose, a mouth, a chin, or a hairline.

11. The communication device of claim 1, wherein the at least one processor is further configured to obtain information identifying the second selection sequence, the second selection sequence being established based on a sequential selection of portions of second digital image.

12. The communication device of claim 11, wherein the second digital image includes at least a portion of a second reference face.

13. The communication device of claim 12, wherein the at least one processor is further configured to:
   determine that the first reference face matches the second reference face; and
   establish an association between the second selection sequence and the first digital image data, when the first reference face is determined to match the second reference face.

14. The communications device of claim 12, wherein the at least one processor is further configured to:
   determine that the first reference face matches the second reference face; and
   authenticate the identity of the first user, when the first reference face is determined to match the second reference face, and the first selection sequence is determined to match the second selection sequence.

15. The communications device of claim 1, wherein the at least one processor is further configured to:
   obtain profile data associated with the first user, the profile data specifying the first user profile or the second user profile; and
   in response to the authentication of the first user, perform operations consistent with the obtained profile data.

16. The communications device of claim 15, wherein the operations include unlocking the communications device, modifying an operational state of the communications device, modifying a display parameter of the communications device, requesting execution of a financial services transaction involving an account of the first user, or executing a purchase transaction involving the first user.

17. The communications device of claim 1, wherein:
   the first selection sequence comprises the identified features that corresponds to the sequentially selected portions of the first digital image data; and
   the second selection sequence comprises additional features of the first reference face.

18. The communications device of claim 1, wherein the least one processor is further configured to:
   detect an established contact between an appendage of the first user and the surface of the touchscreen display;
   determine the contact position on the surface of the touchscreen display unit that corresponds to the established contact; and
   based on the generated data, identify the selected portion of the first digital image data and the feature of the first reference face that corresponds to the determined contact position.

19. A computer-implemented method, comprising:
   generating, using at least one processor, an electronic command to present first digital image data using a touchscreen display of a communications device, the first digital image data identifying at least a portion of a first reference face of a first user, and the first digital image data being received from the digital camera;
   using the at least one processor, identifying pixels of the presented first digital image data that correspond to features of the first reference face and generating data that maps the identified pixels and the corresponding features to spatial positions on a surface of the touchscreen display unit;
   receiving, using the at least one processor, and through the touchscreen display unit, information identifying a sequential selection of portions of the first digital image data by the first user, the received information associating the sequentially selected portions of the first digital image data with corresponding contact positions on the surface of the touchscreen display unit;
   based on the generated mapping data, identifying, using the at least one processor, the features of the first reference face that corresponds to the contact positions;
   determining, using the at least one processor, that a first selection sequence of the identified features matches a second selection sequence associated with the first digital image; and
   authenticating, using the at least one processor, an identity of the first user, when the first selection sequence is determined to match the second selection sequence,
   wherein the second selection sequence comprises a first authentication sequence or a second authentication sequence,
   wherein the first user establishes the first authentication sequence and associates the first authentication sequence with a first user profile, the first user profile enabling the first user to access functionalities of client device and executable applications stored within the storage device,
   wherein the first user establishes the second authentication sequence and associates the second authentication sequence with a second user profile, the second user profile limiting an access of the first user to one or more of the functionalities and the mobile applications that transmit or receive data across a mobile communications network, and
   wherein the first and second user profiles are associated with the first digital image.

20. An apparatus, comprising:
a communications unit;
a storage device; and
at least one processor coupled to the communications unit and the storage device, the storage device storing software instructions for controlling the at least one processor when executed by the at least one processor, and the at least one processor being operative with the software instructions and configured to:
   identify a sequential selection of portions of a first digital image, the first digital image identifying a portion of a first reference face, the first digital image being presented on a touchscreen display unit of a device connected to the apparatus across a communications network, and the selected portions of the first digital image being associated with corresponding contact positions on the surface of the touchscreen display unit;
   obtain data that (i) maps pixels of the first digital image to features of the first reference face and (ii) maps the pixels and the features to spatial positions on a surface of the touchscreen display unit;

based on the obtained data, identify the features of the first reference face that correspond to the contact positions;
establish a first selection sequence comprising the identified features that correspond to the sequential selection of the first image portions;
determine that the first selection sequence matches a second selection sequence associated with the first digital image; and
authenticate an identity of a first user, when the first selection sequence is determined to match the second selection sequence,
wherein the second selection sequence comprises a first authentication sequence or a second authentication sequence,
wherein the first user establishes the first authentication sequence and associates the first authentication sequence with a first user profile, the first user profile enabling the first user to access functionalities of client device and executable applications stored within the storage device; and
wherein the first user establishes the second authentication sequence and associates the second authentication sequence with a second user profile, the second user profile limiting an access of the first user to one or more of the functionalities and the mobile applications that transmit or receive data across a mobile communications network, and
wherein the first and second user profiles are associated with the first digital image.

\* \* \* \* \*